Oct. 26, 1926.
A. R. HAMNER
1,604,910
PNEUMATIC COLLECTING APPARATUS
Filed July 13, 1925    3 Sheets-Sheet 1
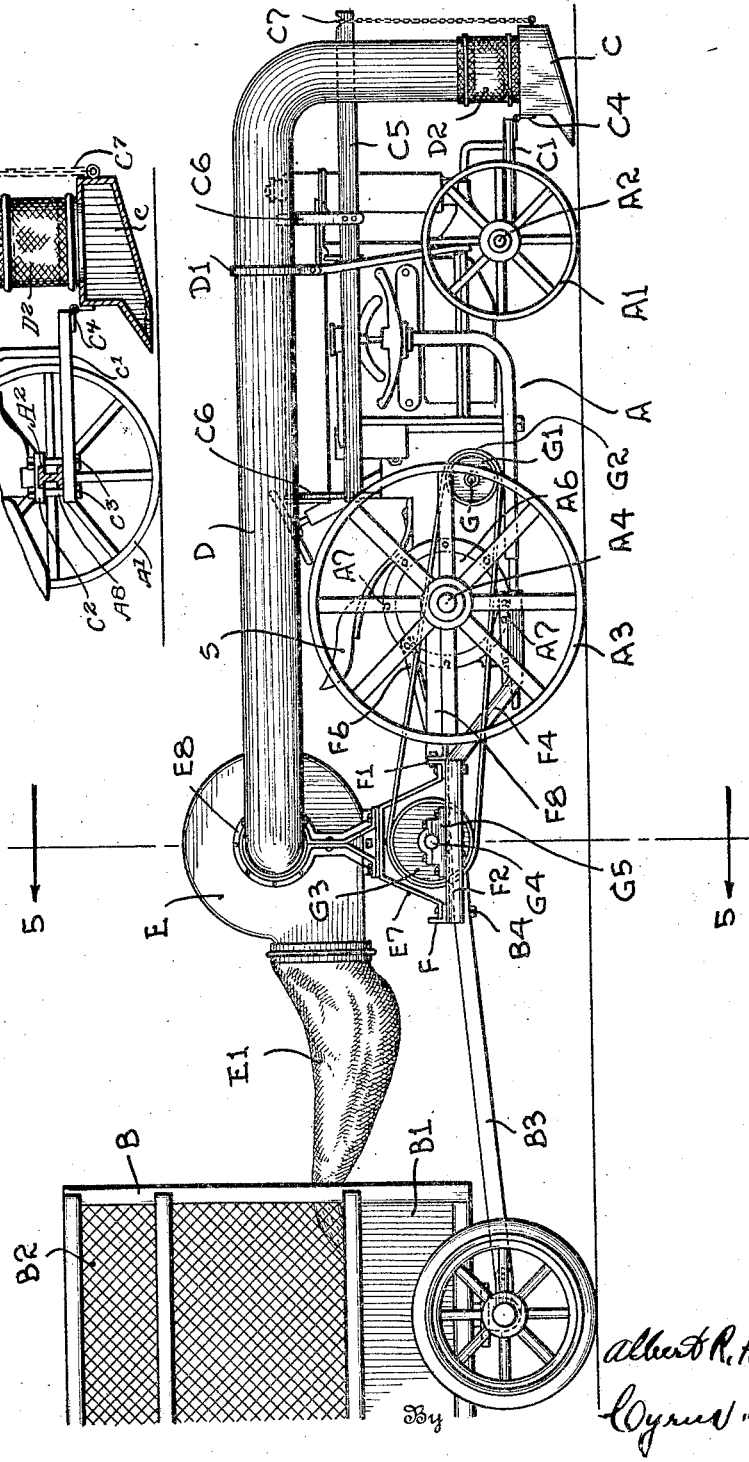

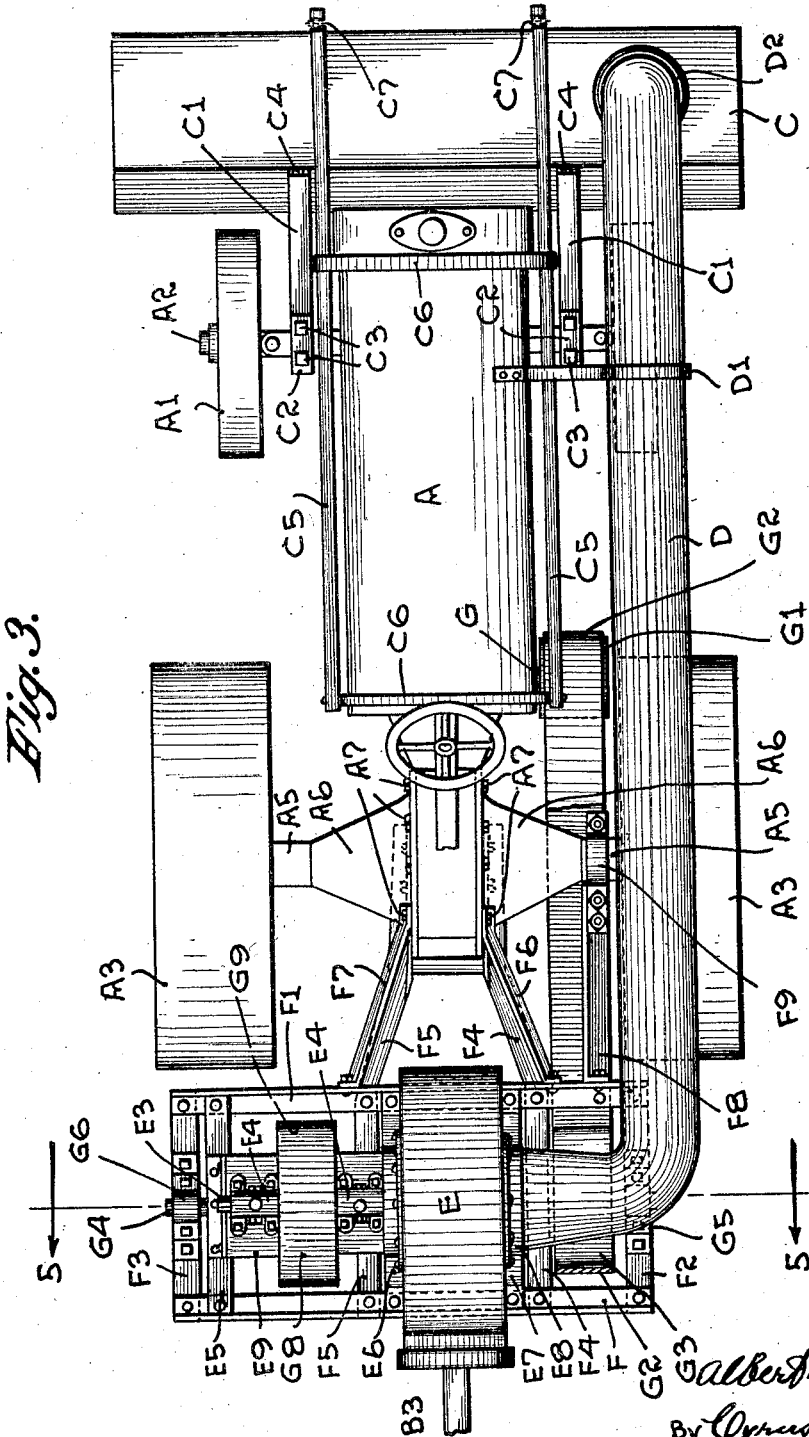

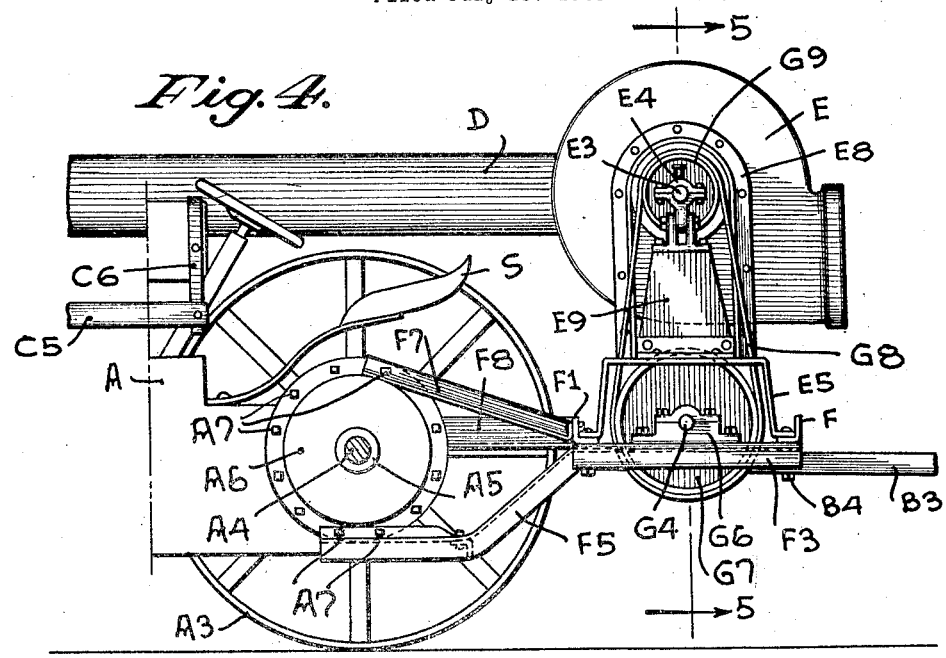
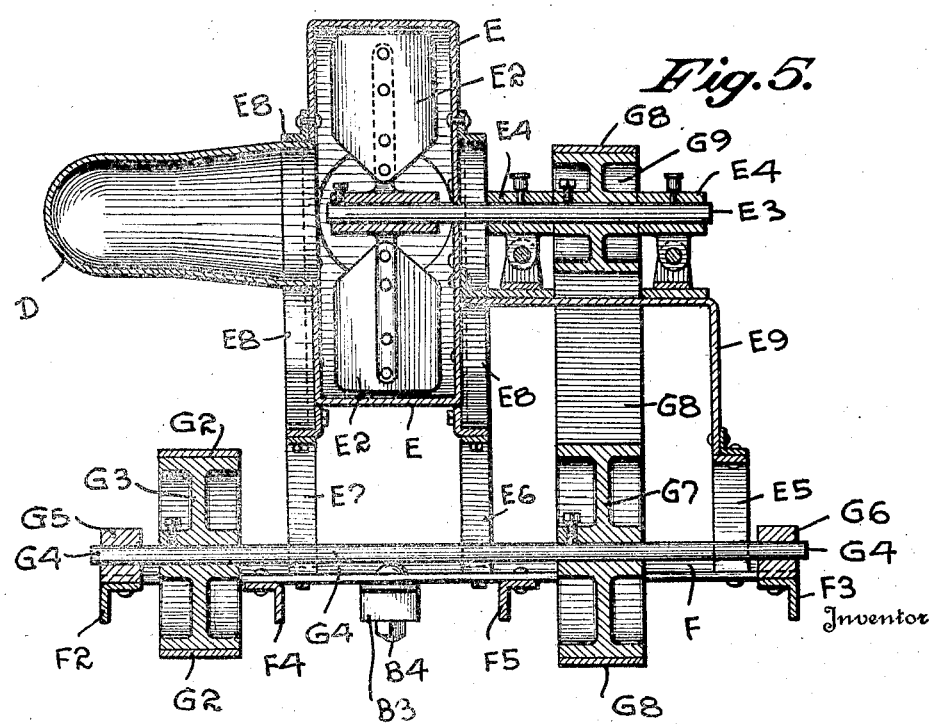

Patented Oct. 26, 1926.

1,604,910

UNITED STATES PATENT OFFICE.

ALBERT R. HAMNER, OF COLLIERVILLE, TENNESSEE.

PNEUMATIC COLLECTING APPARATUS.

Application filed July 13, 1925. Serial No. 43,297.

This invention relates generally to apparatus movable over the ground for collecting material from the surface of the ground by means of a mouth piece into which air is drawn by the creation of a partial vacuum in a part of the apparatus. While my apparatus is applicable generally for such use, it is intended especially for use in the recovery of seeds which have fallen to the ground from the plants on which the seeds grew. My machine has been built and practically used for collecting the seeds of the Lespedeza plant after haying, that plant being cultivated as a hay crop in the lower portions of the Mississippi Valley.

The object of this invention is to produce such a machine in form for economical building and adapted to cover large ground area in limited time.

In the form shown in the drawings, the apparatus includes a tractor, parts being added to such tractor to make the complete apparatus.

In the accompanying drawings,

Fig. 1 is an elevation of the right hand side of an apparatus embodying my improvement, the illustration including the forward part of a seed receiving wagon;

Fig. 2 is a sectional view of the apparatus shown in the right hand lower part of Fig. 1;

Fig. 3 is a plan of the apparatus shown in Fig. 2;

Fig. 4 is an elevation of the rear part of the left hand side of the apparatus shown by Fig. 2;

Fig. 5 is an upright section on the line, 5—5 of Figs. 1, 2, 3 and 4.

Referring to said drawings, A is a well-known tractor. $A^1$, $A^1$ are the front wheels of the tractor. $A^2$ are the front wheel journals. $A^3$, $A^3$ are the rear wheels. $A^4$ is the rear axle. $A^5$ is the rear axle casing. $A^6$ is the gear casing surrounding the rear axle. $A^7$, $A^7$ are horizontal bolts extending through the gear casing heads.

At the front of the machine is a mouth piece, C, placed transversely to the length of the machine and reaching close to the ground. This mouth piece is supported as will be described further on.

A pneumatic pipe, D, extends upward from the right hand part of said mouth piece to approximately the height of the upper part of the tractor and thence rearward along the right hand part of the apparatus to an exhaust fan casing, E, mounted on a framing to be described further on. A flexible or pliable tube, $E^1$, extends from the discharge opening of the fan into the seed receiving wagon, B. The seeds are to be drawn by vacuum action from the ground into the mouth piece, C, and thence through the pipe, D, and the fan casing, E, and the tube, $E^1$. The fan exhausts air from the tube, D, and drives it through the tube, $E^1$. The seed receiving wagon, B, has in its upper structure, $B^2$, sufficient openings to allow the escape of air upward and laterally and permit the seeds to fall by gravity into the wagon body, $B^1$.

The fan, $E^2$, and its shaft, $E^3$, and a counter-shaft, $G^4$, and belt, $G^8$, for driving the fan are supported upon a frame extending rearward from and secured to the rear end of the tractor. As first elements, said frame includes a rear transverse horizontal angle bar, F, and a similar front angle bar, $F^1$, and a right hand angle bar, $F^2$, and a left hand angle bar, $F^3$. These four bars over-lap at their meeting ends and are riveted or bolted to each other immovably to form a rigid rectangular frame. The bars, F and $F^1$, rest on and have their horizontal flanges riveted or bolted to two oblique angle bars, $F^4$ and $F^5$, the bar, $F^4$, being at the right and the bar $F^5$, being at the left. Said bars project forward of the transverse bars, $F^1$, and extend obliquely downward from the bar, $F^1$, to approximately the level of the lower part of the gear casing, $A^6$. Thence each of said bars extend forward and has its horizontal flange turned upward to over-lap the adjacent face of the gear casing and receive two of the bolts, $A^7$, which, as above described, extend into or through the gear casing. Associated with the bar, $F^4$, is a brace, $F^6$, having its rear end bent to lie over the upright flange of the bar, $F^1$, and be riveted or bolted thereto. Said brace extends obliquely upward and forward and over-laps a part of the adjacent upright face of the gear casing, $A^6$, and receives one of the bolts, $A^7$. A similar brace, $F^7$, is associated in the same manner with the bars, $F^5$ and $F^1$, and extends obliquely forward and upward and over-laps a part of the adjacent upright face of the gear casing and receives one of the bolts, $A^7$. Another brace, $F^8$, has its rear end bolted or riveted to the right hand part of the upright flange of the angle bar, $F^1$, and extends thence horizontally forward and is secured to the right hand axle casing, A⁵, by means of a coupling strap, F⁹. The special function of this brace is to resist strain exerted by the belt, G², tending to draw the fan supporting frame forward.

On the angle bars, F² and F³, are seated bearings, G⁵ and G⁶. A counter-shaft, G⁴, extends from one of said bearings to the other and has its ends rotatable in said bearings. On the right hand side of the tractor, forward of the axle, A⁴, is a horizontal shaft, G, receiving motion from the tractor engine. A pulley, G¹, surrounds and is fixed to said shaft. A belt, G², extends around said pulley, and the pulley, G³, which surrounds and is fixed on the counter-shaft, G⁴, between the bars, F² and F⁴. Thus motion is imparted to said counter-shaft. Between the bars, F³ and F⁵, a pulley, G⁷, surrounds and is fixed to the counter-shaft, G⁴. A chair, E⁵, of inverted U-form has its ends resting on and secured to the horizontal flanges of the transverse angle bars, F and F¹. Another chair, E⁶, of similar form rests on and is secured in a similar manner to the bars, F and F¹. A similar chair, E⁷, in a similar manner rests on and is secured to bars, F and F¹. The fan casing, E, rests on the chairs, E⁶ and E⁷, and is riveted or bolted thereto. A housing or pier, E⁹, rests on the chair, E⁵, and is secured thereto and to the left hand upright wall of the fan casing. On the upper face of said housing are seated two bearings, E⁴, in which rests the shaft, E³, of the fan, E², the fan being located within the fan casing, E. Between the bearings, E⁴, and in the upright plane of the pulley, G⁷, a pulley, G⁹, surrounds and is fixed to the fan shaft, E³. A belt, G⁸, surrounds the pulleys, G⁷ and G⁹. It will now be seen that rotation of the pulley, G¹, by the rotation of the tractor shaft, G, will cause the rotation of the fan shaft, E³, and the fan. The pneumatic tube, D, is coupled to the right hand wall of the fan on the axial line of the fan by the aid of the ring flange, E⁸, the lower end of which rests on the chair, E⁷. Rotation of the fan tends to throw air from the fan axis outward by centrifugal action to the outer wall of the fan casing. The fan is rotated in the proper direction to cause the radial outward moving air to move forcibly out of the fan body and outward through the tube, E¹, into the seed receiving wagon.

At the front end of the tractor, a brace, D¹, surrounds the pneumatic pipe, D, and is secured to the tractor. Between the forward, upright end of the pipe, D, and the mouth piece, C, is a tubular section, D², of cloth or similar flexible or pliable material forming connection between the mouth piece and the tube, D.

At each side of the tractor, a bar, C¹, bears against the lower face of the forward axle, A⁸, and extends thence forward to the upper part of the mouth piece, C. Said bar is secured to the axle by means of a clamping plate, C², and bolts, C³. A hinge, C⁴, joins the upper rear part of the mouth piece, C, to the forward end of each bar, C¹. Said hinges permit the oscillating of the mouth piece on the axial line of said hinges.

At each side of the tractor is a horizontal bar, C⁵ supported by straps, C⁶, resting on the tractor. To the forward end of each of said bars is coupled one end of a chain, C⁷, the other end of each of said chains being coupled to the forward part of the mouth piece, C. Said chains limit the downward turning of the mouth piece on the hinges, C⁴, and permit tilting of the mouth piece when the latter meets irregularities in the ground surface.

Fig. 2 discloses the cross section of the mouth piece, C, and makes it clear that only the rear lower part of the mouth piece is open toward the ground for the upward passing seeds. In a machine built under my direction and operated, this opening is about two inches wide in cross section. The seed receiving wagon, B, is made to act as a trailer to the main part of the apparatus. For this purpose, a tongue or reach, B³, is coupled to the forward axle of the wagon and to the rear transverse frame bar, F, by means of a bolt, B⁴.

During the operation of the apparatus, the driver occupies the seat, S, in the usual manner.

It will be observed that the parts added to the tractor to form the complete pneumatic collecting apparatus constitute an attachment to the tractor; and said attachment may be removed, leaving the tractor in ordinary form.

I claim as my invention,

1. In a pneumatic collecting apparatus, the combination with a tractor having a gear casing on its rear axle, of a transverse mouth piece supported at the ground at the front of the tractor, a fan supporting frame attached to the tractor gear casing, a fan on said frame, a tube extending from the mouth piece to the fan, and driving means connecting a tractor driven shaft and the fan, substantially as described.

2. In a pneumatic collecting apparatus, the combination with a tractor having a gear casing on its rear axle, of a transverse mouth piece supported at the ground at the front of the tractor, a fan supporting frame attached to the tractor gear casing and the axle casing, a fan on said frame, a tube extending from the mouth piece to the fan, and driving means connecting a tractor driven shaft and the fan, substantially as described.

3. In a pneumatic collecting apparatus, the combination with a tractor, of a plurality of bars extending forward from the forward part of the tractor, a transverse mouth piece hinged by its rear to a part of said bars, chains coupled to the front of the mouth piece and a part of said bars, a fan structure at the rear of the tractor, a tube extending from the mouth piece to the fan structure, and driving means connecting a tractor driven shaft and the fan, substantially as described.

4. In a pneumatic collecting apparatus, the combination with a tractor, of a transverse mouth piece supported at the ground at the front of the tractor, a supporting frame attached to the tractor gear casing, said frame including two longitudinal bars extending rearward from the gear casing, two transverse bars resting on said longitudinal bars, longitudinal bars joining the ends of said transverse bars, and braces extending from the forward transverse bar to the tractor gear casing, a fan, means supporting the fan on said frame, a tube extending from the mouth piece to the fan, and driving means connecting a tractor driven shaft and the fan, substantially as described.

In testimony whereof I have signed my name, this 30th day of June, in the year one thousand nine hundred and twenty-five.

ALBERT R. HAMNER.